United States Patent
Ishiguchi

(10) Patent No.: US 10,290,854 B2
(45) Date of Patent: May 14, 2019

(54) METHOD OF MANUFACTURING PASTE FOR MANUFACTURING OF NEGATIVE ELECTRODE, METHOD OF MANUFACTURING NEGATIVE ELECTRODE FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: NEC ENERGY DEVICES, LTD., Sagamihara-shi, Kanagawa (JP)

(72) Inventor: Kou Ishiguchi, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 266 days.

(21) Appl. No.: 14/772,416

(22) PCT Filed: Dec. 10, 2013

(86) PCT No.: PCT/JP2013/083042
§ 371 (c)(1),
(2) Date: Sep. 3, 2015

(87) PCT Pub. No.: WO2014/141552
PCT Pub. Date: Sep. 18, 2014

(65) Prior Publication Data
US 2016/0013473 A1    Jan. 14, 2016

(30) Foreign Application Priority Data

Mar. 15, 2013 (JP) .................................. 2013-053200

(51) Int. Cl.
*H01M 4/133* (2010.01)
*H01M 4/1393* (2010.01)
(Continued)

(52) U.S. Cl.
CPC ......... *H01M 4/133* (2013.01); *H01M 4/0404* (2013.01); *H01M 4/1393* (2013.01);
(Continued)

(58) Field of Classification Search
None
See application file for complete search history.

(56) References Cited

U.S. PATENT DOCUMENTS

2006/0046147 A1* 3/2006 Nakai ............... H01M 4/0404
429/235
2007/0275302 A1  11/2007 Sotowa et al.
(Continued)

FOREIGN PATENT DOCUMENTS

JP    8-111222 A    4/1996
JP    11-213990 A   8/1999
(Continued)

OTHER PUBLICATIONS

International Search Report for PCT/JP2013/083042 dated Mar. 18, 2014.
(Continued)

*Primary Examiner* — Jeremiah R Smith
(74) *Attorney, Agent, or Firm* — Sughrue Mion, PLLC

(57) ABSTRACT

Provided is a method of manufacturing paste for manufacturing of a negative electrode of a lithium ion secondary battery which contains a graphite material, a conductive auxiliary agent, a thickening agent, and a water-based binder. The method includes: a process (A) of dry-mixing the graphite material and the conductive auxiliary agent to prepare a mixture containing the graphite material and the conductive auxiliary agent; a process (B) of adding an aqueous solution, which contains the thickening agent, to the mixture, and wet-mixing the resultant mixture to prepare a paste precursor; and a process (C) of adding an aqueous
(Continued)

100 emulsion solution, which contains the water-based binder, to the paste precursor, and additionally wet-mixing the resultant mixture to prepare the paste for manufacturing of a negative electrode.

7 Claims, 2 Drawing Sheets

(51) Int. Cl.
*H01M 4/62* (2006.01)
*H01M 4/587* (2010.01)
*H01M 4/04* (2006.01)
H01M 4/583 (2010.01)
H01M 4/139 (2010.01)
H01M 10/0525 (2010.01)
H01M 4/02 (2006.01)
H01M 4/36 (2006.01)

(52) U.S. Cl.
CPC ........... *H01M 4/587* (2013.01); *H01M 4/621* (2013.01); *H01M 4/622* (2013.01); *H01M 4/625* (2013.01); *H01M 4/139* (2013.01); *H01M 4/366* (2013.01); *H01M 4/583* (2013.01); *H01M 10/0525* (2013.01); *H01M 2004/027* (2013.01)

(56) References Cited

U.S. PATENT DOCUMENTS

| 2009/0214949 | A1* | 8/2009 | Ugawa | H01M 4/621 |
| | | | | 429/199 |
| 2010/0040949 | A1* | 2/2010 | Nanno | H01M 4/13 |
| | | | | 429/209 |
| 2012/0070732 | A1* | 3/2012 | Kim | H01M 4/362 |
| | | | | 429/211 |
| 2012/0189905 | A1* | 7/2012 | Ishii | C01B 31/04 |
| | | | | 429/163 |

FOREIGN PATENT DOCUMENTS

| JP | 2005-85729 | A | | 3/2005 | | |
| JP | 2005-222933 | A | | 8/2005 | | |
| JP | 2006-107896 | A | | 4/2006 | | |
| JP | 2007-44974 | A | | 2/2007 | | |
| JP | 2009-016265 | | * | 1/2009 | ............. | H01M 4/02 |
| JP | 2009-16265 | A | | 1/2009 | | |
| JP | 2010-108624 | A | | 5/2010 | | |
| JP | 2011-44320 | A | | 3/2011 | | |
| JP | 2011-63673 | A | | 3/2011 | | |
| JP | 2012-195239 | A | | 10/2012 | | |

OTHER PUBLICATIONS

Communication dated Jul. 25, 2017 from the Japanese Patent Office in counterpart Application No. 2015-505237.

* cited by examiner

METHOD OF MANUFACTURING PASTE FOR MANUFACTURING OF NEGATIVE ELECTRODE, METHOD OF MANUFACTURING NEGATIVE ELECTRODE FOR LITHIUM ION SECONDARY BATTERY, NEGATIVE ELECTRODE FOR LITHIUM ION SECONDARY BATTERY, AND LITHIUM ION SECONDARY BATTERY

CROSS REFERENCE TO RELATED APPLICATIONS

This application is a National Stage of International Application No. PCT/JP2013/083042 filed Dec. 10, 2013, claiming priority based on Japanese Patent Application No. 2013-053200, filed Mar. 15, 2013, the contents of all of which are incorporated herein by reference in their entirety.

TECHNICAL FIELD

The present invention relates to a method of manufacturing paste for manufacturing of a negative electrode, a method of manufacturing a negative electrode for a lithium ion secondary battery, a negative electrode for a lithium ion secondary battery, and a lithium ion secondary battery.

BACKGROUND ART

Typically, the negative electrode that is used in the lithium ion secondary battery is mainly constituted by a negative electrode active material layer and a current collector. The negative electrode active material layer is obtained by applying paste for manufacturing of a negative electrode, which contains a negative electrode active material such as a graphite material, a conductive auxiliary agent, a thickening agent, a water-based binder, and the like, onto a surface of a current collector such as copper foil (refer to Patent Document 1 and Patent Document 2) and drying the paste.

Here, when a non-uniform portion is present in the negative electrode active material layer, battery characteristics of a lithium ion secondary battery that is obtained may deteriorate. The non-uniform negative electrode active material layer may be easily obtained in a case where the paste for manufacturing of a negative electrode is not uniform. Accordingly, so as to obtain a uniform negative electrode active material layer, it is very important to uniformly disperse respective components such as the negative electrode active material, the conductive auxiliary agent, the thickening agent, and the water-based binder in the paste for manufacturing of a negative electrode.

Examples of a method of manufacturing the paste for manufacturing of a negative electrode include methods described in Patent Document 1 and Patent Document 2.

Patent Document 1 (Japanese Unexamined Patent Publication No. 2006-107896) discloses a method of manufacturing paste. The method includes at least three processes among a first kneading process of kneading graphite and a thickening agent in a powder state in combination with a dispersion medium, a dilution-kneading process of dilution-kneading the resultant kneaded object, which is obtained in the first kneading process, with the dispersion medium, and a finish kneading process of adding a binding agent to the resultant kneaded object that is obtained in the dilution-kneading process and kneading the resultant mixture to manufacture paste.

In Patent Document 1, a kneading shear force in the first kneading process is set to 2.5 times a kneading shear force in the dilution-kneading process and the finish kneading process. In Patent Document 1, it is described that highly dispersed and stable paste can be manufactured according to the setting of the kneading shear force.

Patent Document 2 (Japanese Unexamined Patent Publication No. 11-213990) discloses a method of manufacturing paste in which primary powderization of a solid content in paste is promoted by performing a mixing treatment with a strong shear force in a mixing process before addition of a binding agent resin, and agglomeration of the binding agent resin during mixing is prevented by performing a mixing treatment with a weak shear force in a mixing process after addition of the binding agent resin.

In Patent Document 2, it is described that a battery electrode, which has no pin-hole and crack on an active material layer and in which omission of the active material does not occur, can be obtained.

RELATED DOCUMENT

Patent Document

[Patent Document 1] Japanese Unexamined Patent Publication No. 2006-107896

[Patent Document 2] Japanese Unexamined Patent Publication No. 11-213990

SUMMARY OF THE INVENTION

According to an investigation made by the present inventor, it has been found that in the paste for manufacturing of a negative electrode which is obtained by the manufacturing methods described in Patent Document 1 and Patent Document 2, storage stability is inferior.

Therefore, an object of the invention is to provide a method of manufacturing paste for manufacturing of a negative electrode which is capable of stably obtaining the paste for manufacturing of a negative electrode which is excellent in storage stability.

The present inventor has conducted a thorough investigation to accomplish the above. As a result, he has found that if the paste is manufactured after a graphite material and a conductive auxiliary are dry-mixed in advance to prepare a powder mixture, it is possible to stably obtain paste for manufacturing of a negative electrode which is excellent in storage stability, and he has accomplished the invention.

According to an aspect of the invention, there is provided a method of manufacturing paste for manufacturing of a negative electrode of a lithium ion secondary battery which contains a graphite material, a conductive auxiliary agent, a thickening agent, and a water-based binder. The method includes a process (A) of dry-mixing the graphite material and the conductive auxiliary agent to prepare a mixture containing the graphite material and the conductive auxiliary agent, a process (B) of adding an aqueous solution, which contains the thickening agent, to the mixture, and wet-mixing the resultant mixture to prepare a paste precursor, and a process (C) of adding an aqueous emulsion solution, which contains the water-based binder, to the paste precursor, and additionally wet-mixing the resultant mixture to prepare the paste for manufacturing of a negative electrode.

According to another aspect of the invention, there is provided a method of manufacturing a negative electrode for a lithium ion secondary battery which contains a graphite material, a conductive auxiliary agent, a thickening agent, and a water-based binder. The method includes a process of preparing paste for manufacturing of a negative electrode by the method of manufacturing paste for manufacturing of a negative electrode, and a process of forming a negative electrode by using the paste for manufacturing of a negative electrode which is obtained.

According to still another aspect of the invention, there is provided a negative electrode for a lithium ion secondary battery which is obtained by the method of manufacturing a negative electrode for a lithium ion secondary battery.

According to still another aspect of the invention, there is provided a lithium ion secondary battery including at least the negative electrode for a lithium ion secondary battery, an electrolyte, and a positive electrode.

According to the invention, it is possible to provide a method of manufacturing paste for manufacturing of a negative electrode which is capable of stably obtaining paste for manufacturing of a negative electrode which is excellent in storage stability.

BRIEF DESCRIPTION OF THE DRAWINGS

The above and other objects, advantages and features of the present invention will be more apparent from the following description of certain preferred embodiments taken in conjunction with the accompanying drawings.

DESCRIPTION OF EMBODIMENTS

Figure 1:
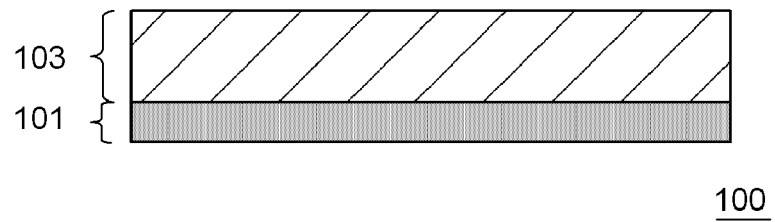
FIG. 1 is a cross-sectional view illustrating an example of a structure of a negative electrode for a lithium ion secondary battery according to an embodiment of the invention.

Hereinafter, an embodiment of the invention will be described with reference to the accompanying drawings. In addition, in all of the drawings, the same reference numeral is given to the same component, and description thereof will be appropriately omitted. In addition, respective components are schematically illustrated in a shape, a size, and an arrangement relation in a degree for comprehension of the invention, and there is a difference from the actual dimensions thereof.

In addition, unless otherwise stated, a layer containing a negative electrode active material is referred to as a negative electrode active material layer, and a component in which the negative electrode active material layer is formed on a current collector is referred to as a negative electrode unless otherwise stated. In addition, "to" represents equal to or more than and equal to or less than.

A method of manufacturing paste for manufacturing of a negative electrode according to this embodiment is a method of manufacturing paste for manufacturing of a negative electrode of a lithium ion secondary battery which contains a graphite material (a), a conductive auxiliary agent (b), a thickening agent (c), and a water-based binder (d). The method includes at least a process (A), process (B), and a process (C) which are described below.

(A) Process of dry-mixing a graphite material (a) and a conductive auxiliary agent (b) to prepare a mixture containing the graphite material (a) and the conductive auxiliary agent (b)

(B) Process of adding an aqueous solution, which contains the thickening agent (c), to the mixture, and wet-mixing the resultant mixture to prepare a paste precursor (C) Process of adding an aqueous emulsion solution, which contains the water-based binder (d), to the paste precursor, and additionally wet-mixing the resultant mixture to prepare the paste for manufacturing of a negative electrode <Constituent Material of Paste for Manufacturing of Negative Electrode>

First, description will be given of respective constituent materials which are used in the method of manufacturing of the paste for manufacturing of a negative electrode according to this embodiment.

(Graphite Material (a))

The graphite material (a) is not particularly limited as long as the graphite material (a) is a typical graphite material that can be used in a negative electrode of a lithium ion secondary battery. Examples of the graphite material (a) include natural graphite, artificial graphite that is manufactured by subjecting petroleum-based coke and coal-based coke to a heat treatment, and the like.

Here, the natural graphite represents graphite that is naturally produced as an ore. A production area, properties, and the kind of the natural graphite, which is used as a core material of this embodiment, are not particularly limited.

In addition, the artificial graphite represents graphite that is produced by an artificial method and graphite that is close to a perfect crystal of graphite. For example, the artificial graphite is obtained through a firing process and a graphitization process by using tar or coke, which is obtained from a residue and the like after dry distillation of coal and distillation of a crude oil, as a raw material.

In addition, it is preferable that in the graphite material (a) (hereinafter, referred to as a surface-coated graphite), a graphite powder is set as a core material, and at least a part of a surface of the graphite powder is coated with a carbon material that has crystallinity lower than that of the graphite powder. Particularly, it is preferable that an edge portion of the graphite powder is coated with the carbon material. When the edge portion of the graphite powder is coated, it is possible to suppress an irreversible reaction between the edge portion and an electrolytic solution, and as a result, it is possible to suppress a decrease in initial charging and discharging efficiency due to an increase in an irreversible capacity.

In addition, when using the surface-coated graphite, it is possible to further improve binding properties with a binder in comparison to a case where the graphite is used alone, and thus it is possible to reduce an amount of the binding agent. As a result, it is possible to improve battery characteristics of a lithium ion secondary battery that is obtained.

Here, examples of the carbon material having crystallinity that is lower than that of the graphite powder include amorphous carbon such as soft carbon and hard carbon.

Examples of the graphite powder that is used as a core material include natural graphite, artificial graphite that is manufactured by subjecting petroleum-based coke and coal-based coke to a heat treatment, and the like. In this embodiment, these graphite powders may be used alone or in combination of two or more kinds thereof. Among these, the natural graphite is preferable in consideration of the cost.

The surface-coated graphite according to this embodiment may be prepared by mixing the graphite powder and an organic compound which is carbonized through a firing process and becomes a carbon material having crystallinity lower than that of the graphite powder, and by firing and carbonizing the organic compound.

The organic compound, which is mixed with the graphite powder, is not particularly limited as long as the organic compound is carbonized through firing and a carbon material having crystallinity lower than that of the graphite powder is obtained. Examples of the organic compound include tar such as petroleum-based tar and coal-based tar; pitch such as petroleum-based pitch and coal-based pitch; a thermoplastic resin such as polyvinyl chloride, polyvinyl acetate, polyvinyl butyral, polyvinyl alcohol, polyvinylidene chloride, and polyacrylonitrile; a thermosetting resin such as a phenol resin and a furfuryl alcohol resin; a natural resin such as cellulose; aromatic hydrocarbon such as naphthalene, alkyl naphthalene, and anthracene; and the like.

In this embodiment, these organic compounds may be used alone or in combination of two or more kinds thereof. In addition, these organic compounds may be used in a state of being dissolved or dispersed in a solvent as necessary.

Among the organic compounds, at least one kind that is selected from the tar and the pitch is preferable in consideration of the cost.

In the surface-coated graphite according to this embodiment, a ratio (hereinafter, referred to as a coated amount) of the carbon material that is derived from the organic compound is preferably equal to or more than 0.7% by mass and equal to or less than 8.0% by mass on the basis of 100% by mass of a negative electrode active material.

When the coated amount of the carbon material is set to be equal to or lower than the upper limit, an area of intercalating and deintercalating lithium ions increases, and thus it is possible to improve rate characteristics of a lithium ion secondary battery that is obtained.

When the coated amount of the carbon material is set to be equal to or greater than the lower limit, it is possible to suppress a decrease in the initial charging and discharging efficiency due to an increase in the irreversible capacity. In addition, when the coated amount of the carbon material is set to be equal to or greater than the lower limit, it is possible to improve stability of paste for manufacturing of a negative electrode which is obtained.

Here, the coated amount can be calculated through thermogravimetric analysis. More specifically, a thermogravimetric analyzer (for example, TGA7 analyzer manufactured by PerkinElmer Co., Ltd.) is used, and when a temperature of a negative electrode active material is raised to 900° C. at a temperature-rising rate of 5° C./min under an oxygen atmosphere, a reduced mass from a temperature at which a mass reduction starts to a temperature at which the mass reduction is accelerated through a temperature region in which a mass reduction rate is gradual may be set as the coated amount.

A specific surface area of the graphite material (a) in accordance with a nitrogen absorption BET method is preferably equal to or more than 1.0 m$^2$/g and equal to or less than 6.0 m$^2$/g, and more preferably equal to or more than 2.0 m$^2$/g and equal to or less than 5.0 m$^2$/g.

When the specific surface area is set to be equal to or less than the upper limit, it is possible to suppress a decrease in the initial charging and discharging efficiency due to an increase in the irreversible capacity. In addition, when the specific surface area is set to be equal to or less than the upper limit, it is possible to improve the stability of paste for manufacturing of a negative electrode which is obtained.

When the specific surface area is set to be equal to or greater than the lower limit, an area of intercalating and deintercalating lithium ions increases, and thus it is possible to improve rate characteristics of a lithium ion secondary battery that is obtained.

In addition, when the specific surface area is set in the above-described range, it is possible to improve the binding properties of the water-based binder.

An average particle size $d_{50}$ in a volume-basis particle size distribution of the graphite material (a) in accordance with a laser diffraction scattering type particle size distribution measurement method is not particularly limited, but the average particle size $d_{50}$ is preferably equal to or more than 10 μm and equal to or less than 30 μm, and more preferably equal to or more than 15 μm and equal to or less than 25 μm. When the average particle size $d_{50}$ is in the above-described range, balance between the binding properties and the dispersibility of an active material becomes more excellent.

When the total amount of a solid content of the paste for manufacturing of a negative electrode according to this embodiment is set to 100 parts by mass, an amount of the graphite material (a) that is used is preferably equal to or more than 94 parts by mass and equal to or less than 98.9 parts by mass, and more preferably equal to or more than 95 parts by mass and equal to or less than 97.9 parts by mass.

(Conductive Auxiliary Agent (b))

The conductive auxiliary agent (b) is not particularly limited as long as the conductive auxiliary agent (b) has electron conductivity and improves conductivity of an electrode. Examples of the conductive auxiliary agent (b) of this embodiment include a carbon material such as acetylene black, ketjen black, carbon black, carbon nano-fiber, and graphite having a particle size smaller than that of the graphite that is used as an active material. These conductive auxiliary agents (b) may be used alone or in combination of two or more kinds thereof.

When the total amount of the solid content of the paste for manufacturing of a negative electrode is set as 100 parts by mass, an amount of the conductive auxiliary agent (b) that is used is preferably equal to or more than 0.1 parts by mass and equal to or less than 2.0 parts by mass, and more preferably equal to or more than 0.3 parts by mass and equal to or less than 1.2 parts by mass.

When the amount of the conductive auxiliary agent (b) that is used is in the above-described range, balance between coatability of the paste for manufacturing of a negative electrode and the binding properties of the binder becomes more excellent.

(Thickening Agent (c))

The thickening agent (c) is not particularly limited as long as the thickening agent improves the coatability of the paste for manufacturing of a negative electrode. Examples of the thickening agent (c) include water-soluble polymers such as a cellulose-based polymer such as carboxymethyl cellulose, methyl cellulose, and hydroxypropyl cellulose, and an ammonium salt and an alkali metal salt thereof; polycarboxylic acid; polyethylene oxide; polyvinylpyrrolidone; polyacrylate such as sodium polyacrylate; and polyvinyl alcohol.

Among these, at least one kind, which is selected from the group consisting of the cellulose-based polymer, the ammonium salt of the cellulose-based polymer, and the alkali metal salt of the cellulose-based polymer, is preferable, and the carboxymethyl cellulose, the ammonium salt of the carboxymethyl cellulose, and the alkali metal salt of the carboxymethyl cellulose are more preferable.

The thickening agent (c) is used as an aqueous solution by dissolving a powder-like thickening agent in a water-based medium. According to this, it is possible to improve dispersibility of the thickening agent (c) without blocking contact between the graphite material (a) and the conductive auxiliary agent (b).

There is no particular limitation to the water-based medium that dissolves the thickening agent (c) as long as the water-based medium can dissolve the thickening agent (c), and distilled water, ion-exchanged water, city water, industrial water, and the like can be used. Among these, the distilled water or the ion-exchanged water is preferable. In addition, a solvent such as alcohol, which has a high hydrophilic property with water, can be mixed with the water.

The above-described thickening agents (c) may be used alone or in combination of two or more kinds thereof. When the total amount of the solid content of the paste for manufacturing of a negative electrode is set as 100 parts by mass, an amount of the thickening agent (c) that is used is preferably equal to or more than 0.5 parts by mass and equal to or less than 2.0 parts by mass, more preferably equal to or more than 0.8 parts by mass and equal to or less than 1.7 parts by mass, and still more preferably equal to or more than 0.8 parts by mass and equal to or less than 1.5 parts by mass. When the amount of the thickening agent (c) that is used is in the above-described range, the balance between the coatability of the paste for manufacturing of the negative electrode and the binding properties of the binder becomes more excellent.

(Water-Based Binder (d))

The water-based binder (d) is not particularly limited as long as an electrode can be formed, and sufficient electrochemical stability is provided, and examples thereof include polyacrylic acid, polytetrafluoroethylene, polyvinylidene fluoride, a styrene butadiene rubber, polyimide, and the like. These water-based binders (d) may be used alone or in combination of two or more kinds thereof. Among these, the styrene butadiene rubber is preferable.

In addition, the water-based binder (d) in this embodiment represents a binder capable of being dispersed in the water-based medium to form an aqueous emulsion solution.

When the total amount of the solid content of the paste for manufacturing of a negative electrode is set as 100 parts by mass, an amount of the water-based binder (d) that is used is preferably equal to or more than 0.5 parts by mass and equal to or less than 3.0 parts by mass, and more preferably equal to or more than 1.0 part by mass and equal to or less than 2.5 parts by mass.

The water-based binder (d) is used as an aqueous emulsion solution by dispersing a powder-shaped binder in the water-based medium. According to this, it is possible to improve the dispersibility of the water-based binder (d) without blocking contact between the graphite material (a) and the conductive auxiliary agent (b).

There is no particular limitation to the water-based medium that disperses the water-based binder (d) as long as the water-based medium can disperse the water-based binder (d), and distilled water, ion-exchanged water, city water, industrial water, and the like can be used. Among these, the distilled water or the ion-exchanged water is preferable. In addition, a solvent such as alcohol, which has a high hydrophilic property with water, can be mixed with the water.

<Method of Manufacturing Paste for Manufacturing of Negative Electrode>

Next, description will be given of a method of manufacturing the paste for manufacturing of a negative electrode according to this embodiment.

The method of manufacturing the paste for manufacturing of a negative electrode according to this embodiment is a method of manufacturing the paste for manufacturing of a negative electrode of a lithium ion secondary battery which contains a graphite material (a), a conductive auxiliary agent (b), a thickening agent (c), and a water-based binder (d). The method includes at least a process (A), process (B), and a process (C) which are described below.

(A) Process of dry-mixing a graphite material (a) and a conductive auxiliary agent (b) to prepare a mixture containing the graphite material (a) and the conductive auxiliary agent (b)

(B) Process of adding an aqueous solution, which contains the thickening agent (c), to the mixture, and wet-mixing the resultant mixture to prepare a paste precursor (C) Process of adding an aqueous emulsion solution, which contains the water-based binder (d), to the paste precursor, and additionally wet-mixing the resultant mixture to prepare the paste for manufacturing of a negative electrode.

Hereinafter, the respective processes will be described.

((A) Process of Preparing Mixture)

In the process (A) of preparing the mixture, the graphite material (a) and the conductive auxiliary agent (b) are dry-mixed (also referred to as dry blending) to prepare a powder mixture.

In this embodiment, when the process (A) is performed, in the process (B) and the process (C), it is possible to increase dispersibility of respective materials which constitute the paste for manufacturing of a negative electrode even at a low stirring rate.

According to an investigation performed by the present inventor, it was found that when strong shearing is applied to the paste that contains the thickening agent in a manner similar to the manufacturing method described in Patent Document 1 and Patent Document 2, molecular chains of the thickening agent in the paste are cut out.

Therefore, the present inventor further has made a thorough investigation. As a result, the present inventor has found that when performing the process (A), it is possible to increase dispersibility of the respective materials which constitute the paste for manufacturing a negative electrode while suppressing cutting-out of the molecular chains of the thickening agent (c) in the process (B) and the process (C). In addition, the present inventor has also found that the paste for manufacturing of a negative electrode that is obtained in this manner is excellent in storage stability, and a lithium ion secondary battery including a negative electrode obtained by using the paste is excellent in battery characteristics, and he has accomplished the invention.

As a mixer that performs dry-mixing, it is preferable to use a planetary motion type mixer, and more preferably a planetary motion type planetary mixer. When using the mixer, it is possible to sufficiently mix the graphite material (a) and the conductive auxiliary agent (b) while suppressing scattering of the graphite material (a) and the conductive auxiliary agent (b). In addition, the planetary motion type mixer represents a mixer having a rotation function and an orbital revolution function as a stirring mechanism. The planetary motion type planetary mixer represents a mixer including a blade having a rotation function and an orbital revolution function as a stirring mechanism.

A rotating velocity during the dry-mixing in the process (A) is preferably in a range of equal to or more than 0.12 m/sec and equal to or less than 0.30 m/sec, and more preferably equal to or more than 0.13 m/sec and equal to or less than 0.26 m/sec.

When the rotating velocity during the dry-mixing in the process (A) is in the above-described range, it is possible to sufficiently mix the graphite material (a) and the conductive auxiliary agent (b) while suppressing scattering of the graphite material (a) and the conductive auxiliary agent (b).

In addition, an orbital velocity during the dry-mixing in the process (A) is preferably in a range of equal to or more than 0.04 m/sec and equal to or less than 0.10 m/sec, and more preferably equal to or more than 0.05 m/sec and equal to or less than 0.09 m/sec.

When the orbital velocity during the dry-mixing in the process (A) is in the above-described range, it is possible to sufficiently mix the graphite material (a) and the conductive auxiliary agent (b) while suppressing scattering of the graphite material (a) and the conductive auxiliary agent (b).

A mixing time during the dry-mixing in the process (A) is not particularly limited, and is, for example, equal to or more than 5 minutes and equal to or less than 1 hour.

A temperature during the dry-mixing in the process (A) is not particularly limited, and is, for example, equal to or more than 15° C. and equal to or less than 30° C.

((B) Process of Preparing Paste Precursor)

In the process (B) of preparing of the paste precursor, an aqueous solution that contains the thickening agent (c) is added to the mixture that is obtained in the process (A) and the resultant mixture is wet-mixed to prepare the paste precursor.

As a mixer that performs wet-mixing, it is preferable to use a planetary motion type mixer, and more preferably a planetary motion type planetary mixer. When using this mixer, it is possible to perform sufficient mixing while performing stirring at a low speed. Accordingly, it is possible to increase dispersibility of the respective materials which constitute the paste for manufacturing of a negative electrode while suppressing cutting-out of molecular chains of the thickening agent (c) due to the stirring and mixing. In addition, as a result, it is possible to obtain more excellent paste for manufacturing of a negative electrode due to storage stability.

In addition, the dispersibility of the paste for manufacturing of a negative electrode, which is obtained, is more excellent, and thus when using the paste for manufacturing of a negative electrode, it is possible to obtain more uniform negative electrode active material layer. As a result, it is possible to obtain a lithium ion secondary battery that is more excellent in battery characteristics.

A rotating velocity during the wet-mixing in the process (B) is preferably in a range of equal to or more than 0.35 m/sec and equal to or less than 0.60 m/sec, and more preferably equal to or more than 0.40 m/sec and equal to or less than 0.55 m/sec.

When the rotating velocity during the wet-mixing in the process (B) is in the above-described range, it is possible to increase the dispersibility of the respective materials which constitute the paste for manufacturing of a negative electrode while further suppressing the cutting-out of the molecular chains of the thickening agent (c).

In addition, an orbital velocity during the wet-mixing in the process (B) is preferably in a range of equal to or more than 0.12 m/sec and equal to or less than 0.20 m/sec, and more preferably in a range of equal to or more than 0.14 m/sec and equal to or less than 0.18 m/sec.

When the orbital velocity during the wet-mixing in the process (B) is in the above-described range, it is possible to increase the dispersibility of the respective materials which constitute the paste for manufacturing of a negative electrode while further suppressing the cutting-out of the molecular chains of the thickening agent (c).

In addition, in the process (B), it is preferable to adjust a solid content concentration of the paste precursor so as to satisfy conditions of the following Expression (1).

$$-X/2+71.0 \leq Y \leq -X/2+75.5 \quad (1)$$

In Expression (1), X represents a specific surface area (m$^2$/g) of the graphite material (a) in accordance with a nitrogen adsorption BET method, and Y represents a solid content concentration (%) of the paste precursor.

When the solid content concentration Y of the paste precursor is equal to or lower than the upper limit of Expression (1), it is possible to more appropriately suppress a shear force that is applied to the paste precursor, and thus it is possible to further suppress the cutting-out of the molecular chains of the thickening agent (c).

In addition, when the solid content concentration Y of the paste precursor is equal to or greater than the lower limit of Expression (1), it is possible to further increase the dispersibility of the respective materials which constitute the paste for manufacturing of a negative electrode.

Accordingly, when the solid content concentration Y of the paste precursor satisfies Expression (1), it is possible to obtain more excellent paste for manufacturing of a negative electrode due to storage stability.

In addition, the dispersibility of the paste for manufacturing of a negative electrode, which is obtained, is more excellent, and thus when using the paste for manufacturing of a negative electrode, it is possible to obtain a more uniform negative electrode active material layer. As a result, it is possible to obtain a lithium ion secondary battery that is more excellent in battery characteristics.

The solid content concentration Y of the paste precursor can be adjusted by adjusting a concentration or an addition amount of the aqueous solution that contains the thickening agent (c), or by adding the above-described water-based medium for dilution.

Here, it is important to adjust the solid content concentration to an appropriate range in a step before addition of the water-based binder (d), that is, in the process (B). The reason for this is because even when adjusting the solid content concentration after addition of the water-based binder (d), it is difficult to obtain an effect of improving the dispersibility.

A mixing time during the wet-mixing in the process (B) is not particularly limited, and is, for example, equal to or more than 10 minutes and equal to or less than 1 hour.

A temperature during the wet-mixing in the process (B) is not particularly limited, and is, for example, equal to or more than 17° C. and equal to or less than 23° C.

((C) Process of Preparing Paste for Manufacturing of Negative Electrode)

In the process (C) of preparing the paste for manufacturing paste for manufacturing of a negative electrode, an aqueous emulsion solution that contains the water-based binder (d) is added to the paste precursor that is obtained in the process (B) and the resultant mixture is additionally wet-mixed to prepare the paste for manufacturing of a negative electrode.

As a mixer that performs wet-mixing, it is preferable to use a planetary motion type mixer, and more preferably a planetary motion type planetary mixer. When using this mixer, it is possible to perform sufficient mixing while performing stirring at a low speed. Accordingly, it is possible to increase dispersibility of the respective materials which constitute the paste for manufacturing of a negative electrode while suppressing cutting-out of molecular chains of the thickening agent (c) due to the stirring and mixing, and while suppressing agglomeration of the water-based binder (d). In addition, as a result, it is possible to obtain more excellent paste for manufacturing of a negative electrode due to storage stability.

In addition, the dispersibility of the paste for manufacturing of a negative electrode, which is obtained, is more excellent, and thus when using the paste for manufacturing of a negative electrode, it is possible to obtain a more uniform negative electrode active material layer. As a result, it is possible to obtain a lithium ion secondary battery that is more excellent in battery characteristics.

A rotating velocity during the wet-mixing in the process (C) is preferably in a range of equal to or more than 0.12 m/sec and equal to or less than 0.30 m/sec, and more preferably equal to or more than 0.13 m/sec and equal to or less than 0.26 m/sec.

When the rotating velocity during the wet-mixing in the process (C) is in the above-described range, it is possible to increase the dispersibility of the respective materials which constitute the paste for manufacturing of a negative electrode while further suppressing the cutting-out of the molecular chains of the thickening agent (c) and the agglomeration of the water-based binder (d) due to stirring and mixing.

In addition, an orbital velocity during the wet-mixing in the process (C) is preferably in a range of equal to or more than 0.04 m/sec and equal to or less than 0.10 m/sec, and more preferably in a range of equal to or more than 0.05 m/sec and equal to or less than 0.09 m/sec.

When the orbital velocity during the wet-mixing in the process (C) is in the above-described range, it is possible to increase the dispersibility of the respective materials which constitute the paste for manufacturing of a negative electrode while further suppressing the cutting-out of the molecular chains of the thickening agent (c) and the agglomeration of the water-based binder (d) due to stirring and mixing.

In addition, in this embodiment, it is preferable that the rotating velocity during the wet-mixing in the process (C) is set to be slower than the rotating velocity during the wet-mixing in the process (B). According to this, it is possible to increase the dispersibility of the respective materials which constitute the paste for manufacturing of a negative electrode while further suppressing the agglomeration of the water-based binder (d) due to the stirring and mixing.

In addition, in this embodiment, it is preferable that the orbital velocity during the wet-mixing in the process (C) is set to be slower than the orbital velocity during the wet-mixing in the process (B). According to this, it is possible to increase the dispersibility of the respective materials which constitute the paste for manufacturing of a negative electrode while further suppressing the agglomeration of the water-based binder due to the stirring and mixing.

A mixing time during the wet-mixing in the process (C) is not particularly limited, and is, for example, equal to or more than 10 minutes and equal to or less than 30 minutes.

A temperature during the wet-mixing in the process (C) is not particularly limited, and is, for example, equal to or more than 15° C. and equal to or less than 23° C.

Here, in the process (C), the thickening agent (c) may be additionally added to adjust the viscosity of the paste for manufacturing of a negative electrode to a viscosity that is suitable for coating.

In addition, in the method of manufacturing the paste for manufacturing of a negative electrode according to this embodiment, it is preferable that a thixotropy index value, which is defined as a ratio of viscosity at a shear rate of 20.4 $s^{-1}$ to viscosity at a shear rate of 2.04 $s^{-1}$ at 20° C. and is measured by a B-type viscometer, of the paste for manufacturing of a negative electrode is adjusted to 2.5 or greater, and more preferably 3.0 or greater.

When the thixotropy index value is equal to or greater than the lower limit, it is possible to obtain more excellent paste for manufacturing of a negative electrode due to storage stability.

In addition, the dispersibility of the paste for manufacturing a negative electrode which is obtained is more excellent, and when using the paste for manufacturing of a negative electrode, it is possible to obtain a more uniform negative electrode active material layer. As a result, it is possible to obtain a lithium ion secondary battery that is more excellent in battery characteristics.

The thixotropy index value represents an index of a cut-out situation of the thickening agent (c). As the thixotropy index value is higher, it is considered that the cutting-out of the thickening agent (c) in the paste is more suppressed.

Accordingly, it is possible to adjust the thixotropy index value of the paste for manufacturing of a negative electrode that is obtained in the above-described range by suppressing the cutting-out of the molecular chains of the thickening agent (c) through adjustment of the rotating velocity and the orbital velocity during the wet-mixing, the solid content concentration of the paste precursor, and the like in the process (B) and the process (C).

In addition, the solid content concentration of the paste for manufacturing of a negative electrode can be adjusted through adjustment of the concentration and the addition amount of the aqueous emulsion solution that contains the water-based binder (d), or addition of the above-described water-based medium for dilution.

((D) Vacuum-Defoaming Process)

In the method of manufacturing the paste for manufacturing of a negative electrode according to this embodiment, a vacuum-defoaming process (D) may be further performed. According to this, it is possible to remove bubbles that exist in the paste, and thus it is possible to improve coatability of the paste.

In the vacuum defoaming, the bubbles may be removed by subjecting a container or a shaft of the mixer to a sealing treatment, or the vacuum defoaming may be performed after transfer to another container.

<Method of Manufacturing Negative Electrode of Lithium Ion Secondary Battery>

Next, description will be given of a method of manufacturing a negative electrode 100 for a lithium ion secondary battery according to this embodiment. FIG. 1 is a cross-sectional view illustrating an example of a structure of a negative electrode 100 for a lithium ion secondary battery according to this embodiment of the invention.

The method of manufacturing the negative electrode 100 for a lithium ion secondary battery according to this embodiment includes at least two processes of (1) and (2) which are described below.

(1) Process of preparing paste for manufacturing of a negative electrode by the method of manufacturing the paste for manufacturing of a negative electrode (2) Process of forming the negative electrode 100 for a lithium ion secondary battery by using the paste for manufacturing a negative electrode which is obtained Hereinafter, the respective processes will be described.

((1) Process of Preparing Paste for Manufacturing of Negative Electrode)

In the process (1) of preparing the paste for manufacturing of a negative electrode in this embodiment, the paste for manufacturing of a negative electrode is prepared by using the above-described method of manufacturing the paste for manufacturing of a negative electrode according to this embodiment. Here, description thereof will not be repeated.

((2) Process of Forming Negative Electrode by Using Paste for Manufacturing of Negative Electrode which is Obtained)

In the process (2) of forming the negative electrode, for example, the paste for manufacturing of a negative electrode which is obtained in the process (1) is applied onto a current collector 101, and is dried to form a negative electrode active material layer 103, thereby obtaining the negative electrode 100 for a lithium ion secondary battery in which the negative electrode active material layer 103 is formed on the current collector 101.

As a method of applying the paste for manufacturing of a negative electrode onto the current collector 101, a typically known method can be used. Examples of the method include a reverse roll method, a direct roll method, a doctor blade method, a knife method, an extrusion method, a curtain method, a gravure method, a bar method, a dipping method, a squeeze method, and the like.

The paste for manufacturing of a negative electrode may be applied to a one-sided surface or both surfaces of the current collector 101. In the case of the application to the both surfaces of the current collector 101, the application may be sequentially performed from a one-sided surface or the application may be simultaneously performed to the both surfaces. In addition, the application to the surface of the current collector 101 may be performed continuously or intermittently. The thickness, the length, or the width of an applied layer can be appropriately determined in accordance with the size of a battery.

As a method of drying the paste for manufacturing of a negative electrode that is applied, a typically known method can be used. Particularly, it is preferable that hot wind, a vacuum, infrared rays, far-infrared rays, electron beams, and low-temperature wind are used alone or in combination thereof. A drying temperature is typically in a range of equal to or more than 30° C. and equal to or less than 350° C.

The current collector 101 that is used to manufacture the negative electrode according to this embodiment is not particularly limited as long as the current collector 101 is a typical current collector that can be used in a lithium ion secondary battery, but copper is preferable from the viewpoints of price, ease of availability, electrochemical stability, and the like. In addition, a shape of the current collector 101 is also not particularly limited, and a foil-shaped current collector having a thickness in a range of, for example, 0.001 mm to 0.5 mm can be used.

The negative electrode 100 for a lithium ion secondary battery according to this embodiment may be pressed as necessary. As a pressing method, a typically known method can be used. Examples of the pressing method include a mold pressing method, a calender pressing method, and the like. A pressing pressure is not particularly limited, and is, for example, in a range of 0.2 t/cm$^2$ to 3 t/cm$^2$.

The thickness or density of the negative electrode active material layer 103 according to this embodiment is appropriately determined in accordance with a use and the like of a battery, and may be typically set in accordance with known information without particular limitation.

<Negative Electrode for Lithium Ion Secondary Battery>

The negative electrode 100 for a lithium ion secondary battery according to this embodiment is obtained by the above-described method of manufacturing the negative electrode 100 for a lithium ion secondary battery.

<Lithium Ion Secondary Battery>

Figure 2:
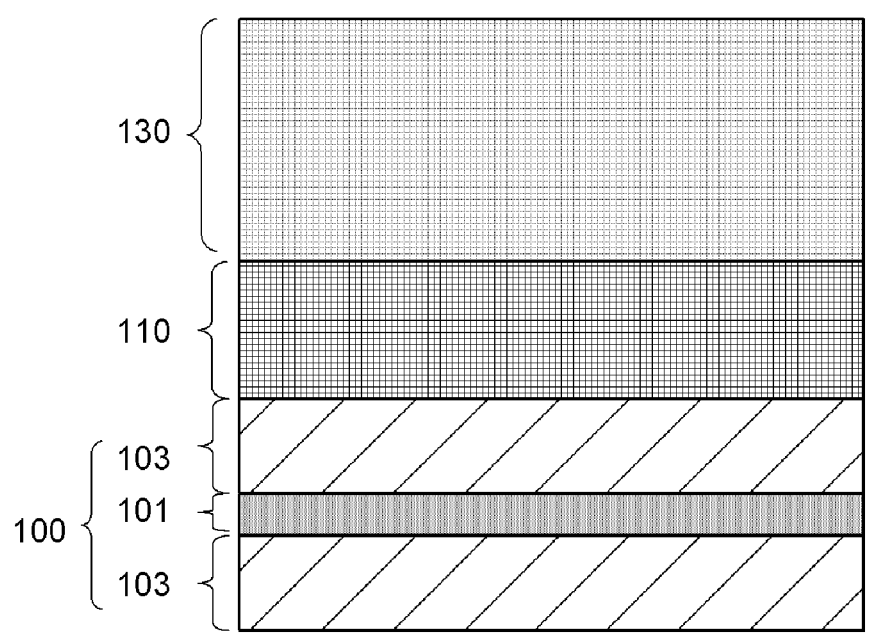
FIG. 2 is a cross-sectional view illustrating an example of a structure of the lithium ion secondary battery according to the embodiment.

Subsequently, description will be given of a lithium ion secondary battery 150 according to this embodiment. FIG. 2 is a cross-sectional view illustrating an example of a structure of the lithium ion secondary battery 150 according to this embodiment of the invention. The lithium ion secondary battery 150 according to this embodiment includes at least the negative electrode 100 for a lithium ion secondary battery which is obtained by the above-described method of manufacturing a negative electrode for a lithium ion secondary battery, an electrolyte 110, and a positive electrode 130.

The lithium ion secondary battery 150 according to this embodiment can be prepared in accordance with a known method.

For example, as the electrode, a laminated body or wound body can be used. As an exterior body, a metal exterior body or an aluminum laminate exterior body can be appropriately used. A shape of a battery may be an arbitrary shape such as that of a coin type, a button type, a sheet type, a cylindrical type, a square type, and a flat type.

(Positive Electrode)

A positive electrode active material that is used for the lithium ion secondary battery according to this embodiment is appropriately selected in accordance with the use thereof, and a material, which is capable of reversibly deintercalating and intercalating lithium ions, and has high electron conductivity for ease of electron transport, is preferable. Examples of the material include a composite oxide of lithium and a transition metal such as a lithium-nickel composite oxide, a lithium-cobalt composite oxide, a lithium-manganese composite oxide, and a lithium-manganese-nickel composite oxide; a transition metal sulfide such as $TiS_2$, FeS, and $MoS_2$; a transition metal oxide such as MnO, $V_2O_5$, $V_6O_{13}$, and $TiO_2$; an olivine type lithium phosphorus oxide; and the like.

For example, the olivine type lithium phosphorus oxide contains at least one kind of element among the group consisting of Mn, Cr, Co, Cu, Ni, V, Mo, Ti, Zn, Al, Ga, Mg, B, Nb, and Fe, lithium, phosphorus, and oxygen. Partial elements of the compounds may be substituted with other elements for an improvement in characteristics thereof.

Among these, the olivine-type lithium iron phosphorous oxide, the lithium-cobalt composite oxide, a lithium-nickel composite oxide, the lithium-manganese composite oxide, and the lithium-manganese-nickel composite oxide are preferable. The positive electrode active materials have a high operational potential, a large capacity, and a high energy density.

As the positive electrode current collector, for example, aluminum foil can be used.

In addition, the positive electrode 130 in this embodiment can be manufactured by a known manufacturing method.

(Electrolyte)

As an electrolyte in an electrolytic solution of a battery, all known lithium salts can be used, and may be selected in accordance with a kind of the active material. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, LiCl, LiBr, $LiB(C_2H_5)_4$, $CF_3SO_3Li$, $CH_3SO_3Li$, $LiCF_3SO_3$, $LiC_4F_9SO_3$, $Li(CF_3SO_2)_2N$, a lower fatty acid lithium carboxylate, and the like.

A solvent that dissolves the electrolyte is not particularly limited as long as the solvent is typically used as a liquid that dissolves the electrolyte, and examples thereof include carbonates such as ethylene carbonate (EC), propylene carbonate (PC), butylene carbonate (BC), dimethyl carbonate (DMC), diethyl carbonate (DEC), methyl ethyl carbonate (MEC), and vinylene carbonate (VC); lactones such as γ-butyrolactone and γ-valerolactone; ethers such as trimethoxy methane, 1,2-dimethoxyethane, diethyl ether, 2-ethoxy-ethane, tetrahydrofuran, and 2-methyltetrahydrofuran; sulfoxides such as dimethyl sulfoxide; oxolanes such as 1,3-dioxolane and 4-methyl-1,3-dioxolane; a nitrogen-containing solvent such as acetonitrile, nitromethane, formamide, and dimethyl formamide; organic acid esters such as methyl formate, methyl acetate, ethyl acetate, butyl acetate, methyl propionate, and ethyl propionate; phosphoric acid triesters or diglymes; triglymes; sulfolanes such as sulfolane and methyl sulfolane; oxazolidinone such as 3-methyl-2-oxazolidinone; sultones such as 1,3-propane sultone, 1,4-butane sultone, and naphtha sultone; and the like. These may be used alone or in combination of two or more kinds thereof.

(Separator)

Examples of the separator include a porous separator. Examples of a type of the separator include membrane, film, non-woven fabric, and the like.

Examples of the porous separator include a polyolefin-based porous separator such as a polypropylene-based porous separator and a polyethylene-based porous separator; and a porous separator such as polyvinylidene fluoride, polyethylene oxide, polyacrylonitrile, a polyvinylidene fluoride hexafluoropropylene copolymer.

Hereinbefore, the embodiment of the invention has been described, but the embodiment is illustrative only, and various configurations other than the above-described configuration can be employed.

In addition, the invention is not limited to the above-described embodiment, and a modification, an improvement, and the like in a range capable of accomplishing the object of the invention are included in the invention.

EXAMPLES

Hereinafter, the invention will be described with reference to Examples and Comparative Example, but the invention is not limited to these.

Example 1

<Preparation of Paste for Manufacturing of Negative Electrode>

(1) Process (A)

Hereinafter, an average particle size $d_{50}$ was measured by a MT3000 apparatus manufactured by MicrotracBEL Corp., and a specific surface area was obtained in accordance with a nitrogen absorption method by using Quanta Sorb manufactured by Quantachrome Corporation.

100 g of graphite (the average particle size $d_{50}$: 20 μm, and the specific surface area in accordance with the nitrogen adsorption BET method: 4 m$^2$/g) of which a surface was coated with amorphous carbon, 1.042 g of carbon black (the specific surface area in accordance with the nitrogen adsorption BET method: 60 m$^2$/g), in which primary particles of approximately 30 nm were agglomerated in a chain shape, as the conductive auxiliary agent were put into a planetary motion type planetary mixer.

Next, the dry-mixing was performed for 10 minutes under conditions of a rotating velocity of 0.25 m/sec, an orbital velocity of 0.08 m/sec, and a temperature of 20° C., thereby obtaining a powder mixture.

Here, the graphite (the average particle size $d_{50}$: 20 μm, and the specific surface area in accordance with the nitrogen adsorption BET method: 4 m$^2$/g)) of which a surface was coated with the amorphous carbon was prepared as follows.

Natural graphite having the average particle size $d_{50}$ of 20 μm and the specific surface area of 4 m$^2$/g was used as a core material.

99.0 parts by mass of the natural graphite powder and 1.0 part by mass of a coal-based pitch powder were mixed in a solid-phase state through simple mixing by using a V blender. The resultant mixture powder that was obtained was put into a graphite crucible and was subjected to a heat treatment under a nitrogen gas stream at 1300° C. for 1 hour, thereby obtaining graphite of which a surface was coated with the amorphous carbon.

(2) Process (B)

Next, carboxymethyl cellulose (CMC) in a powder shape was dispersed in water to prepare 1.0% by weight of CMC aqueous solution. 38.862 g of the CMC aqueous solution that was obtained was added into the planetary motion type planetary mixer in which the process (A) was terminated, thereby adjusting a solid content concentration to 72.5%.

Then, the wet-mixing was performed for 30 minutes under conditions of a rotating velocity of 0.50 m/sec, an orbital velocity of 0.16 m/sec, and a temperature of 20° C., thereby obtaining a paste precursor.

(3) Process (C)

Next, an SBR aqueous solution, in which a styrene butadiene rubber (SBR) was dispersed in water and had a solid content concentration of 40%, was prepared. 53.447 g of the CMC aqueous solution and 5.208 g of the SBR aqueous solution that were obtained were added into the planetary motion type planetary mixer in which the process (B) was terminated.

Then, the wet-mixing was performed for 15 minutes under conditions of a rotating velocity of 0.25 m/sec, an orbital velocity of 0.08 m/sec, and a temperature of 20° C., thereby obtaining a paste precursor.

(4) Process (D)

Next, vacuum defoaming was performed to obtain paste for manufacturing of a negative electrode.

<Preparation of Negative Electrode>

The paste for manufacturing of a negative electrode, which was obtained, was intermittently applied to both surfaces of copper foil as a current collector by using die coater, and was dried. Next, an electrode that was obtained was pressed, thereby obtaining a negative electrode.

The negative electrode was punched with a hole having dimensions of 130 mm (vertical)×70 mm (horizontal) while leaving an ear portion to be connected to a negative electrode terminal (excluding dimensions of the ear portion).

<Preparation of Positive Electrode>

75 g of lithium manganate, in which primary particles were agglomerated to form approximately spherical secondary particles, as a positive electrode active material, 25 g of lithium nickelate, 4.30 g of carbon black (the specific surface area in accordance with the nitrogen adsorption BET method: 60 m$^2$/g), in which primary particles of about 30 nm were agglomerated in a chain shape, as a conductive auxiliary agent, and 40.323 g of 8% binder solution, in which polyvinylidene fluoride was dissolved in n-methylpyrrolidone, as a binder were used respectively. These materials were mixed by using the planetary motion type planetary mixer, thereby obtaining paste for manufacturing of a positive electrode for a lithium ion secondary battery.

The paste for manufacturing of a positive electrode, which was obtained, was intermittently applied to both surfaces of aluminum foil as a current collector by using a die coater, and was dried. Then, the aluminum foil was additionally pressed, thereby obtaining a positive electrode.

The positive electrode was punched with a hole having dimensions of 125 mm (vertical)×65 mm (horizontal) while leaving an ear portion to be connected to a negative electrode terminal (excluding dimensions of the ear portion).

<Preparation of Electrode Body>

A separator having dimensions of 131 mm (vertical)×70 mm (horizontal) was prepared, and six layers of the positive electrode and seven layers of the negative electrode were laminated through the separator. The positive electrode and the negative electrode were repetitively and alternately laminated in such a manner that ear portions having the same polarity overlapped each other at the same position, and the negative electrode became the outermost layer.

Ear portions of the negative electrodes were welded to each other and one end of a nickel negative electrode terminal was additionally welded thereto. In addition, ear portions of the positive electrodes were welded to each other and one end of an aluminum positive electrode terminal was additionally welded thereto.

<Preparation of Laminate Battery>

The electrode body to which the positive electrode terminal and the negative electrode terminal were attached was accommodated in a flexible container formed from a laminate film in combination with an electrolytic solution. At this time, the other end of the positive electrode terminal and the other end of the negative electrode terminal were in a state of being led out to the outside of the container, and thus a configuration, in which an external load and a battery were capable of being electrically connected to each other, was obtained.

<Evaluation>

(Evaluation of Storage Stability of Paste for Manufacturing of Negative Electrode)

100 g of the paste for manufacturing of a negative electrode, which was obtained, was put into a plastic container having a lid, and was retained for 3 days under a condition of a temperature of 25° C. in a state in which the lid was closed.

Next, with respect to the paste for manufacturing of a negative electrode before retention and after retention, paste viscosity at 20° C. and at a shear rate of 3.4 s$^{-1}$ was measured by using a B-type viscometer. Then, a viscosity variation rate was calculated by using the following Expression (2) to evaluate the storage stability of the paste for manufacturing of a negative electrode.

Viscosity variation rate(%)=100×(viscosity after retention for 3days)/(viscosity before retention for 3 days) (2)

A: The viscosity variation rate was 17% or less
B: The viscosity variation rate was equal to or greater than 18% and less than 35%
C: The paste for manufacturing a negative electrode was separated through the retention test (determined with the naked eye)

(Measurement of Thixotropy Index (TI))

With respect to the paste for manufacturing of a negative electrode which was obtained, the thixotropy index was measured in the following procedures.

First, viscosity A of the paste for manufacturing of a negative electrode at 20° C. and at a shear rate of 2.04 s$^{-1}$ was measured by using the B-type viscometer. Then, viscosity B of the paste for manufacturing of a negative electrode at 20° C. and at a shear rate of 20.4 s$^{-1}$ was measured by using a B-type viscometer. Then, the thixotropy index was calculated by the following Expression (3).

Thixotropy index(-)=(viscosity B)/(viscosity A) (3)

In addition, a case where a solid content concentration of the paste precursor, which satisfied a conditions of the following Expression (1), was determined as A, and a case where the solid content concentration did not satisfy the condition was determined as B.

$-X/2+71.0 \leq Y \leq -X/2+75.5$ (1)

In Expression (1), X represents the specific surface area (m$^2$/g) of the graphite material (a) in accordance with the nitrogen adsorption BET method, and Y represents the solid content concentration (%) of the paste precursor.

(Evaluation of Battery Characteristics)
(Rate Characteristics)

Next, a charging and discharging test was performed by using a battery that was prepared. Constant current and constant voltage charging was performed at an atmosphere of 20° C. under conditions of an upper limit voltage of 4.2 V, a charging current of 2300 mA, and a total charging time of 150 minutes. Then, constant current discharging (1 C discharging) was performed under conditions of a lower limit voltage of 2.5 V and a discharging current of 2300 mA.

Next, after a pause time of 60 minutes, constant current and constant voltage charging was performed in an atmosphere of 20° C. under conditions of an upper limit voltage of 4.2 V, a charging current of 2300 mA, and a total charging time of 150 minutes. Then, constant discharging (3 C discharging) was performed again under conditions of a lower limit voltage of 2.5 V and a discharging current of 6900 mA. A discharging capacity during 3 C discharging to a discharging capacity during 1 C discharging (100×(discharging capacity during 3 C discharging)/(discharging capacity during 1 C discharging)) was calculated. Results which were obtained are shown in Table 1.

(Cycle Characteristics)

Constant current and constant voltage charging was performed at an atmosphere of 20° C. under conditions of an upper limit voltage of 4.2 V, a charging current of 2300 mA, and a total charging time of 150 minutes. Then, constant current discharging (1 C discharging) was performed under conditions of a lower limit voltage of 2.5 V and a discharging current of 2300 mA. Next, a cycle of the charging and the discharging was repeated, and the number of cycles when reaching 70% of the discharging capacity at the first cycle was obtained. Results which were obtained are shown in Table 1.

Example 2

Manufacturing was performed under the same conditions as in Example 1 except that the solid content concentration in the process (B) was adjusted to 70.0%, and then the respective evaluations were performed. Here, adjustment of the solid content concentration was performed by adjusting an amount of water in the paste precursor. Results which were obtained are shown in Table 1.

Example 3

Manufacturing was performed under the same conditions as in Example 1 except that graphite (the average particle size $d_{50}$: 20 µm, and the specific surface area in accordance with the nitrogen adsorption BET method: 2 m²/g) of which a surface was coated with amorphous carbon was used as the graphite material, and the solid content concentration in the process (B) was adjusted to 73.9%, and the respective evaluations were performed.

Here, graphite (the average particle size $d_{50}$: 20 µm, and the specific surface area in accordance with the nitrogen adsorption BET method: 2 m²/g) of which a surface was coated with amorphous carbon was prepared as follows.

Natural graphite having the average particle size $d_{50}$ of 20 µm and the specific surface area of 2 m²/g was used as a core material.

99.0 parts by mass of the natural graphite powder and 1.0 part by mass of a coal-based pitch powder were mixed in a solid-phase state through simple mixing by using a V blender. The resultant mixture powder that was obtained was put into a graphite crucible and was subjected to a heat treatment under a nitrogen gas stream at 1300° C. for 1 hour, thereby obtaining graphite of which a surface was coated with the amorphous carbon.

Here, adjustment of the solid content concentration was performed by adjusting an amount of water in the paste precursor. Results which were obtained are shown in Table 1.

Example 4

Manufacturing was performed under the same conditions as in Example 1 except that graphite (the average particle size $d_{50}$: 20 µm, and the specific surface area in accordance with the nitrogen adsorption BET method: 2 m²/g) of which a surface was coated with amorphous carbon was used as the graphite material, and the solid content concentration in the process (B) was adjusted to 71.0%, and the respective evaluations were performed. Here, adjustment of the solid content concentration was performed by adjusting an amount of water in the paste precursor. Results which were obtained are shown in Table 1.

Example 5

Manufacturing was performed under the same conditions as in Example 1 except that the solid content concentration in the process (B) was adjusted to 71.3%, and then the respective evaluations were performed. Here, adjustment of the solid content concentration was performed by adjusting an amount of water in the paste precursor. Results which were obtained are shown in Table 1.

Example 6

Manufacturing was performed under the same conditions as in Example 1 except that graphite (the average particle size $d_{50}$: 20 µm, and the specific surface area in accordance with the nitrogen adsorption BET method: 2 m²/g) of which a surface was coated with amorphous carbon was used as the graphite material, and the solid content concentration in the process (B) was adjusted to 72.5%, and the respective evaluations were performed. Here, adjustment of the solid content concentration was performed by adjusting an amount of water in the paste precursor. Results which were obtained are shown in Table 1.

Example 7

Manufacturing was performed under the same conditions as in Example 1 except that the solid content concentration in the process (B) was adjusted to 75.0%, and then the respective evaluations were performed. Here, adjustment of the solid content concentration was performed by adjusting an amount of water in the paste precursor. Results which were obtained are shown in Table 1.

Example 8

Manufacturing was performed under the same conditions as in Example 1 except that the solid content concentration in the process (B) was adjusted to 68.0%, and then the respective evaluations were performed. Here, adjustment of the solid content concentration was performed by adjusting an amount of water in the paste precursor. Results which were obtained are shown in Table 1.

Example 9

Manufacturing was performed under the same conditions as in Example 1 except that graphite (the average particle size $d_{50}$: 20 µm, and the specific surface area in accordance with the nitrogen adsorption BET method: 2 m²/g) of which a surface was coated with amorphous carbon was used as the graphite material, and the solid content concentration in the process (B) was adjusted to 75.0%, and the respective evaluations were performed. Here, adjustment of the solid content concentration was performed by adjusting an amount of water in the paste precursor. Results which were obtained are shown in Table 1.

Example 10

Manufacturing was performed under the same conditions as in Example 1 except that graphite (the average particle size $d_{50}$: 20 µm, and the specific surface area in accordance with the nitrogen adsorption BET method: 2 m²/g) of which a surface was coated with amorphous carbon was used as the graphite material, and the solid content concentration in the process (B) was adjusted to 68.0%, and the respective evaluation were performed. Here, adjustment of the solid content concentration was performed by adjusting an amount of water in the paste precursor. Results which were obtained are shown in Table 1.

Comparative Example 1

Manufacturing was performed under the same conditions as in Example 1 except that the paste for manufacturing of a negative electrode was prepared in the following procedures, and the respective evaluations were performed. Results which were obtained are shown in Table 1.

<Preparation of Paste for Manufacturing of Negative Electrode>

(1) Process 1

100 g of graphite (the average particle size $d_{50}$: 20 µm, and the specific surface area in accordance with the nitrogen adsorption BET method: 4 m²/g) of which a surface was coated with amorphous carbon, 1.042 g of carbon black (the specific surface area in accordance with the nitrogen adsorption BET method: 60 m²/g), in which primary particles of approximately 30 nm were agglomerated in a chain shape, as the conductive auxiliary agent were put into a planetary motion type planetary mixer.

(2) Process 2

Carboxymethyl cellulose (CMC) in a powder shape was dispersed in water to prepare 1.0% by weight of CMC aqueous solution. 38.862 g of the CMC aqueous solution that was obtained was added into the planetary motion type planetary mixer in which the process 1 was terminated, thereby adjusting a solid content concentration to 72.5%.

Then, the wet-mixing was performed for 30 minutes under conditions of a rotating velocity of 0.50 m/sec, an orbital velocity of 0.16 m/sec, and a temperature of 20° C., thereby obtaining a paste precursor.

(3) Process 3

Next, an SBR aqueous solution, in which a styrene butadiene rubber (SBR) was dispersed in water and had a solid content concentration of 40%, was prepared. 53.447 g of the CMC aqueous solution and 5.208 g of the SBR aqueous solution that was obtained were added into the planetary motion type planetary mixer.

Then, the wet-mixing was performed for 15 minutes under conditions of a rotating velocity of 0.25 m/sec, an orbital velocity of 0.08 m/sec, and a temperature of 20° C., thereby obtaining a paste precursor.

(4) Process 4

Next, vacuum defoaming was performed to obtain paste for manufacturing of a negative electrode.

TABLE 1

| | Storage stability of paste | | Specific surface area of graphite material [m²/g] | Solid content concentration of paste precursor [%] | Condition of Expression (1) | TI value | Battery characteristics | |
|---|---|---|---|---|---|---|---|---|
| | Viscosity variation rate [%] | Evaluation | | | | | Rate characteristics | Cycle characteristics |
| Example 1 | 5% | A | 4 | 72.5% | A | 3.1 | 92% | 470 |
| Example 2 | 5% | A | 4 | 70.0% | A | 2.6 | 93% | 490 |
| Example 3 | 6% | A | 2 | 73.9% | A | 2.9 | 90% | 410 |
| Example 4 | 7% | A | 2 | 71.0% | A | 2.7 | 91% | 420 |
| Example 5 | 4% | A | 4 | 71.3% | A | 3.4 | 94% | 510 |
| Example 6 | 6% | A | 2 | 72.5% | A | 3.1 | 93% | 460 |
| Example 7 | 22% | B | 4 | 75.0% | B | 3.3 | 88% | 380 |
| Example 8 | 33% | B | 4 | 68.0% | B | 2.5 | 89% | 410 |
| Example 9 | 27% | B | 2 | 75.0% | B | 3.3 | 86% | 290 |
| Example 10 | 32% | B | 2 | 68.0% | B | 2.6 | 87% | 310 |
| Comparative Example 1 | 43% | C | 4 | 72.5% | A | 2.7 | 79% | 210 |

Priority is claimed on Japanese Patent Application No. 2013-053200, filed Mar. 15, 2013, the content of which is incorporated herein by reference.

The invention claimed is:

1. A method of manufacturing paste for manufacturing of a negative electrode of a lithium ion secondary battery which contains a graphite material, a conductive auxiliary agent, a thickening agent, and a water-based binder, comprising:
  a process (A) of dry-mixing the graphite material and the conductive auxiliary agent to prepare a mixture containing the graphite material and the conductive auxiliary agent;
  a process (B) of adding an aqueous solution, which contains the thickening agent, to the mixture, and wet-mixing the resultant mixture to prepare a paste precursor; and
  a process (C) of adding an aqueous emulsion solution, which contains the water-based binder, to the paste precursor, and additionally wet-mixing the resultant mixture to prepare the paste for manufacturing of a negative electrode,
  wherein a thixotropy index value, which is defined as a ratio of viscosity at a shear rate of 20.4 $s^{-1}$ to viscosity at a shear rate of 2.04 $s^{-1}$ at 20° C. and is measured by a B-type viscometer, of the paste for manufacturing of a negative electrode is adjusted to 2.5 or greater,
  wherein the process (B) of manufacturing the paste precursor includes a process of adjusting a solid content concentration Y to satisfy a condition of $-X/2+71.0 \leq Y \leq -X/2+75.5$ in a state in which a specific surface area (m²/g) of the graphite material in accordance with a nitrogen adsorption BET method is set as X, and a solid content concentration (weight %) of the paste precursor is set as Y,
  wherein the water-based binder includes a styrene butadiene rubber,
  wherein in the graphite material, a graphite powder is set as a core material, and at least a part of a surface of the graphite powder is coated with a carbon material that has crystallinity lower than crystallinity of the graphite powder, and
  wherein, when a total amount of a solid content of the paste for manufacturing a negative electrode is set to 100 parts by mass, an amount of the graphite material that is used is equal to or more than 94 parts by mass and equal to or less than 98.9 parts by mass, an amount of the conductive auxiliary agent that is used is equal to or more than 0.1 parts by mass and equal to or less than 2.0 parts by mass, an amount of the thickening agent that is used is equal to or more than 0.5 parts by mass and equal to or less than 2.0 parts by mass, and an amount of the water-based binder that is used is equal to or more than 0.5 parts by mass and equal to or less than 3.0 parts by mass.

2. The method of manufacturing paste for manufacturing of a negative electrode according to claim 1,
  wherein the dry-mixing in the process (A) is performed by using a planetary motion type mixer.

3. The method of manufacturing paste for manufacturing of a negative electrode according to claim 2,
  wherein the wet-mixing in the process (B) and the process (C) is performed by using the planetary motion type mixer.

4. The method of manufacturing paste for manufacturing of a negative electrode according to claim 1,
  wherein the specific surface area (X) of the graphite material is equal to or more than 1.0 m²/g and equal to or less than 6.0 m²/g.

5. A method of manufacturing a negative electrode for a lithium ion secondary battery which contains a graphite material, a conductive auxiliary agent, a thickening agent, and a water-based binder, comprising:
- a process of preparing paste for manufacturing of a negative electrode by the method of manufacturing paste for manufacturing of a negative electrode according to claim 1; and
- a process of forming a negative electrode by using the paste for manufacturing of a negative electrode which is obtained.

6. A negative electrode for a lithium ion secondary battery which is obtained by the method of manufacturing a negative electrode for a lithium ion secondary battery according to claim 5.

7. A lithium ion secondary battery, comprising at least:
- the negative electrode for a lithium ion secondary battery according to claim 6;
- an electrolyte; and
- a positive electrode.

* * * * *